United States Patent Office 3,250,358
Patented May 10, 1966

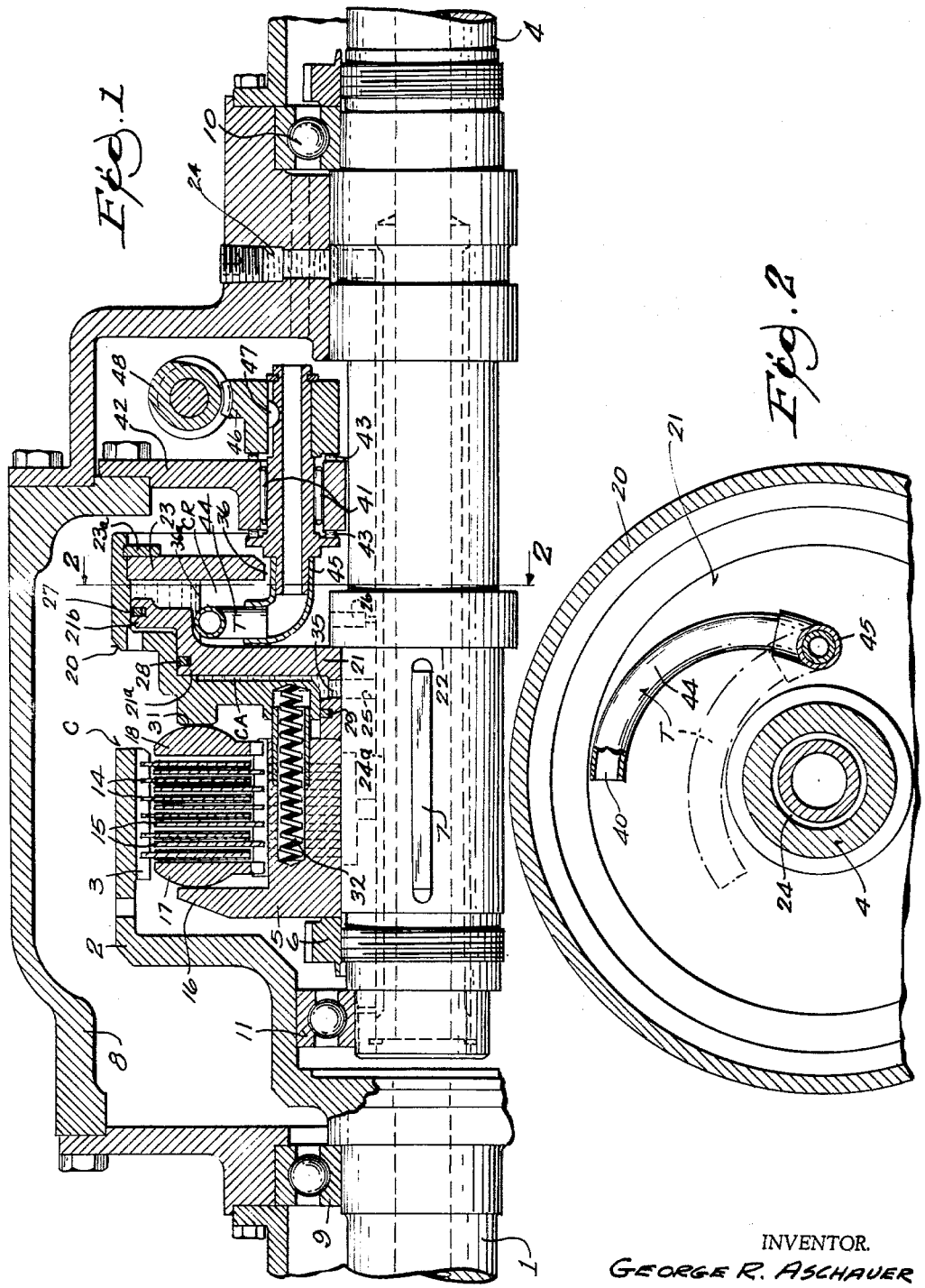

3,250,358
HYDRAULICALLY OPERATED ACTUATING MECHANISM HAVING A SCOOP TUBE CONTROL
George R. Aschauer, Racine, Wis., assignor to Twin Disc Clutch Company, Racine, Wis., a corporation of Wisconsin
Filed June 2, 1964, Ser. No. 371,967
10 Claims. (Cl. 192—105)

The present invention relates to hydraulically operated actuating mechanisms of the centrifugal-thrusting type, and more particularly to a scoop tube for providing a control therefore. The invention finds particular but not exclusive utility when used with clutches.

In accordance with the present invention, a hydraulically actuating mechanism is provided which has a pair of opposed, expansible, fluid chambers for causing actuation of a clutch means, for example, and a scoop tube is provided in one of the chambers for causing an unbalance in the centrifugal head between the two chambers. The resulting axial thrust due to this unbalance causes clutch engagement or other movement between two members. With the mechanism provided by the present invention, the amount of thrust or clutch clamping force can be conveniently, quickly, and precisely varied or programmed as desired.

Another aspect of the present invention relates to providing a mechanism of the above type in which the opposed chambers are normally centrifugally balanced, but the mechanism is nevertheless compact and capable of handling high speed and torque requirements.

In general, the present invention provides an improved hydraulically operated actuating mechanism or thrustor having a scoop tube control for causing unbalanced thrust in opposed hydraulic chambers and consequent reaction between two members.

These and other objects and advantages of the present invention will appear as this disclosure progresses, reference being had to the accompanying drawings, in which:

FIGURE 1 is a longitudinal view, in section, of a clutch embodying the present invention; and FIGURE 2 is a transverse, sectional view taken along line 2—2 in FIGURE 1.

Referring in greater detail to the drawings, a drive member is provided in the form of a shaft 1 having a drum 2 fixed therewith and containing internal splines 3. A driven or output member takes the form of shaft 4 to which is fixed the hub 5 by means of the lock nut 6 threaded on shaft 4 and a key and keyway connection 7.

The shafts 1 and 4 are suitably journalled for rotation in a housing 8 by means of the conventional antifriction bearing assemblies 9 and 10, respectively. In addition, shaft 4 is journalled by bearing assembly 11 in the drum 2.

Obviously, the direction of power flow may be reversed through the clutch from the direction described above, and other forms of drive and driven members may be employed.

Clutch means C are provided between the drive and driven members for the purpose of releasably connecting the members together for rotation as a unit in transmitting power. This clutch means has been shown as the conventional interleaved friction clutch discs 14 and 15 that are axially slidable but rotationally fixed on their splined drum 3 and splined hub 5, respectively. The hub has an integral and radially extending back-up flange 16 and a pair of axially slidable plates 17 and 18 between which the discs are compressed by the hydraulically actuated cylinder 20 now to be described.

The hydraulic means for actuating the clutch includes the axially shiftable cylinder 20 and an axially stationary reacton member or piston 21. The piston is axially fixed on shaft 4 by being held against a shoulder 22 formed on shaft 4 by the lock nut 6 acting through hub 5. This piston is "stepped" construction, having a smaller portion 21a and an outer or larger portion 21b. These portions are concentric and axially spaced from one another.

The cylinder 20 is also of "stepped" construction, and the cylinder includes a plate 23 held in place by a snap ring 23a. The cylinder complements the piston to form therewith a pair of opposed, expansible, fluid chambers CR and CA. Chamber CA is the clutch actuating chamber, and chamber CR is the clutch releasing chamber.

Fluid pressure is introduced into the chambers from a pressure fluid source (not shown), through the inlet part 24, through axial passage 24a, and cross ports 25 and 26 which communicate, respectively, with chambers CA and CR. In FIGURE 1 the chambers CR, CA and the passages have been shown as containing fluid.

Cylinder 20 slides axially on the axially stationary piston, and suitable fluid seals 27, 28, and 29 are provided therebetween. The cylinder has a protruding portion 31 which abuts against the clutch and compresses the discs and engages the clutch, when the chamber CA is expanded sufficiently due to the centrifugal force acting on the fluid therein.

A spring 32 acts between the hub 5 and the cylinder to urge the latter to the clutch disengaged position.

The point or location or origin of the fluid for chamber CA is approximately indicated at 35. The point of origin of the fluid for chamber CR is at 36, namely, at the radially inner edge of the end plate 23 of the cylinder, when the scoop tube is at its innermost position; otherwise the point of origin depends on the location of the scoop tube, for example, at 36a, when the tube is in the position shown in FIGURE 1. These points of origin are important, and ordinarily, it would be difficult to have both of these points located at the same radial position without having them located at a relatively great radial distance from the clutch axis because of the radial space required for the adjustable scoop tube. With the use of the stepped piston and cylinder, it is possible to provide chambers of balanced centrifugal heads and still insure a compact clutch capable of operating at high speeds and torques.

Stated otherwise, the stepped piston construction shown permits the use of a relatively small clutch for high speed and high torque conditions of operation. That is to say, balancing of the hydraulic heads in the clutch releasing and actuating chambers is provided, and the concentrically arranged and radially spaced chambers also result in an axially compact clutch. There is no tendency for either chamber to expand due to unintentional unbalance of centrifugal heads. Such a piston construction is shown in my U.S. Patent No. 2,919,778, issued on January 5, 1960, and entitled "Hydraulically Operated, Multiple Clutch," and reference may be had thereto if a further explanation of this balancing of heads is deemed to be either necessary or desirable.

A stationary scoop tube T is provided in chamber CR and has a fluid intake end 40 which is adapted to scoop the fluid from the chamber CR as the clutch rotates. This tube is adjustably mounted by antifriction, needle bearings 41 in the wall 42 of the housing. Axial thrust bearings 43 also hold the tube precisely in place.

The tube includes the arcuate-shaped, transversely extending portion 44 and the longitudinally extending portion 45. A pinion gear 46 is fixed by key 47 to portion 45 of the tube and meshes with a worm gear 48.

Worm 48 can be turned by any suitable means (not shown) for the purpose of adjusting the radial position of the intake end 40 of the tube. The radial position of the end 40 determines the amount of fluid in chamber CR and consequently the centrifugal head therein due to that fluid. When the end 40 is in the position shown in FIGURE 1, the fluid in chamber CR extends radially inwardly to the point 36a.

When the scoop tube is adjusted radially outwardly, the volume of fluid in chamber CR diminishes. When the tube is retracted to the dotted-line position shown in FIGURE 2, the centrifugal releasing head balances the centrifugal clutch engaging head. Thus the head or amount of fluid in chamber CR is variable, and the resulting centrifugal force which tends to expand chamber CR is variable. A common source of pressure fluid supplies both chambers, and a relatively low pressure, for example, 25 p.s.i. to 50 p.s..i, is sufficient to start the load into motion. By means of the adjustable scoop tube, an unbalance in the centrifugal heads in chambers CA and CR can be created, and the resulting thrust acts to urge the cylinder to the clutch engaged position. Thus, the clamping force is readily varied.

Various modes of carrying out the invention are contemplated as being within the scope of the following claims particularly pointing out and distinctly claiming the subject matter which is regarded as the invention.

I claim:

1. A hydraulically operated clutch comprising, a drive member and a driven member, clutch means between said members for connecting them for rotation together, a cylinder and piston for actuating said clutch means and defining a clutch engaging fluid chamber and an opposed clutch releasing fluid chamber, means for introducing fluid into said chambers for creating a centrifugal head therein as the clutch rotates, said means acting to continuously maintain said engaging fluid chamber full of fluid, and a scoop tube in said clutch releasing chamber and adapted to exhaust fluid therefrom and to a location separate from said engaging chamber to cause the thrust due to centrifugal head in said clutch engaging chamber to be greater than the thrust due to centrifugal head in said releasing chamber, the net force resulting in clutch engagement.

2. A hydraulically operated clutch comprising, a drive member and a driven member, clutch means between said members for connecting them for rotation together, a cylinder and piston for actuating said clutch means and defining a clutch engaging fluid chamber and an opposed clutch releasing fluid chamber, means for introducing fluid into said chambers for causing expansion thereof and a centrifugal head therein, said means acting to continuously maintain said engaging fluid chamber full of fluid, a scoop tube in said clutch releasing chamber and adapted to exhaust fluid therefrom and to a location separate from said engaging chamber, and means for adjusting said tube to vary the amount of fluid in said releasing chamber, whereby the thrust due to centrifugal head in said clutch engaging chamber causes expansion thereof and consequent clutch engagement with a variable clamping force.

3. A hydraulically operated clutch comprising, a drive member and a driven member, clutch means between said members for connecting them for rotation together, a stepped cylinder and piston for actuating said clutch means and defining a clutch engaging fluid chamber and an opposed clutch releasing fluid chamber, said chambers being in concentric and axially spaced relation to one another, means for introducing fluid into said chambers for creating a centrifugal head therein when said clutch is rotating, said means acting to continuously maintain said engaging fluid chamber full of fluid, the relationship between said chambers being such that their centrifugal heads are normally balanced when said clutch means is disengaged, and a scoop tube in said clutch releasing chamber and adapted to exhaust fluid therefrom, and to a location separate from said enaging chamber, whereby the thrust due to centrifugal head in said clutch engaging chamber becomes greater than the thrust due to centrifugal head in said releasing chamber and the resulting unbalanced thrust causes clutch engagement.

4. A hydraulically operated friction clutch comprising, a drive member and a driven member, friction clutch means between said members for connecting them for rotation together, a cylinder and piston for actuating said friction clutch means and defining a clutch engaging fluid chamber and an opposed clutch releasing fluid chamber, common means for introducing fluid into both said chambers, said means acting to continuously maintain said engaging fluid chamber full of fluid, and a scoop tube in said clutch releasing chamber and adapted to exhaust fluid therefrom and to a location separate from said engaging chamber, whereby the thrust due to centrifugal head in said clutch engaging chamber when the clutch is rotating is greater than the thrust due to centrifugal head in said releasing chamber and the resulting unbalanced thrust causes expansion of said engaging chamber and consequent clutch engagement.

5. A hydraulically operated friction clutch comprising, a drive member and a driven member, friction clutch means between said members for connecting them for rotation together, a stepped cylinder and piston for actuating said friction clutch means and defining a clutch engaging fluid chamber and an opposed clutch releasing fluid chamber, said chambers being in concentric and axially spaced relationship to one another, common means for introducing fluid into both of said chambers for causing a centrifugal head therein when said clutch is rotating, said means acting to continuously maintain said engaging fluid chamber full of fluid, a scoop tube in said clutch releasing chamber and adapted to exhaust fluid therefrom, and to a location separate from said engaging chamber and means for adjusting said tube to vary the amount of fluid in said releasing chamber, whereby the thrust due to centrifugal head in said clutch engaging chamber is greater in a variable amount than the thrust due to centrifugal head in said releasing chamber and the resulting unbalanced thrust causes expansion of said engaging chamber and consequent clutch engagement with a variably clamping force.

6. Actuating mechanism comprising, a cylinder and piston defining an engaging fluid chamber and an opposed releasing fluid chamber, means for introducing fluid into said chambers for creating a centrifugal head therein as the mechanism rotates, said means acting to continuously maintain said engaging fluid chamber full of fluid, and a scoop tube in said releasing chamber and adapted to exhaust fluid therefrom and to a location separate from said engaging chamber to cause the thrust due to centrifugal head in said engaging chamber to be greater than the thrust due to centrifugal head in said releasing chamber and the resulting unbalanced thrust to cause expansion of said engaging chamber.

7. A hydraulically operated actuating mechanism comprising, a drive member and a driven member, means between said members for connecting them together, a cylinder and piston for actuating said means and defining and engaging fluid chamber and an opposed releasing fluid chamber, means for introducing fluid into said chambers for causing expansion thereof and a centrifugal head therein, said means acting to continuously maintain said engaging fluid chamber full of fluid, a scoop tube in said releasing chamber and adapted to exhaust fluid therefrom, and to a location separate from said engaging chamber and means for adjusting said tube to vary the amount of fluid in said releasing chamber, whereby the thrust due to centrifugal head in said engaging chamber causes expansion thereof and consequent connection of said members with a variable force.

8. A hydraulically operated actuating mechanism comprising, a drive member and a driven member, means between said members for connecting them together, a stepped cylinder and piston for actuating said means and defining an engaging fluid chamber and an opposer releasing fluid chamber, said chambers being in concentric and axially spaced relation to one another, means for introducing fluid into said chambers for creating a centrifugal head therein when said mechanism is rotating, said means acting to continuously maintain said engaging fluid chamber full of fluid, the relationship between said chambers being such that their centrifugal heads are normally balanced where said clutch means is disengaged, and a scoop tube in said releasing chamber and adapted to exhaust fluid therefrom, and to a location separate from said engaging chamber whereby the thrust due to centrifugal head in said engaging chamber becomes greater than the thrust due to a centrifugal head in said releasing chamber and the resulting unbalanced thrust causes expansion of said engaging chamber and consequent connection of said members.

9. A hydraulically operated actuating mechanism comprising, a drive member and a driven member, means between said members for connecting them together, a cylinder and piston for actuating said means and defining an engaging fluid chamber and an opposed releasing fluid chamber, common means for introducing fluid into both said chambers, said means acting to continuously maintain said engaging fluid chamber full of fluid, and a scoop tube in said releasing chamber and adapted to exhaust fluid therefrom, and to a location separate from said engaging chamber whereby the thrust due to centrifugal head in said engaging chamber when the mechanism is rotating is greater than the thrust due to centrifugal head in said releasing chamber and the resulting unbalanced thrust causes expansion of said engaging chamber and consequent connection of said members.

10. A hydraulically operated actuating mechanism comprising, a drive member and a driven member, means between said members for connecting them together, a stepped cylinder and piston for actuating said means and defining an engaging fluid chamber and an opposed releasing fluid chamber, said chambers being in concentric and axially spaced relationship to one another, common means for introducing fluid into both of said chambers for causing a centrifugal head therein when said mechanism is rotating, said means acting to continuously maintain said engaging fluid chamber full of fluid, a scoop tube in said releasing chamber and adapted to exhaust fluid therefrom, and to a location separate from said engaging chamber and means for adjusting said tube to vary the amount of fluid in said releasing chamber, whereby the thrust due to centrifugal head in said engaging chamber is greater in a variable amount than the thrust due to centrifugal head in said releasing chamber and the resulting unbalanced thrust causes expansion of said engaging chamber and consequent connection of said members with a variably clamping force.

References Cited by the Examiner

UNITED STATES PATENTS

| | | | |
|---|---|---|---|
| 2,210,416 | 8/1940 | Kiep et al. | 192—105 |
| 2,381,786 | 8/1945 | Tyler | 192—105 |
| 2,517,955 | 8/1950 | Zimmerman | 192—105 |

FOREIGN PATENTS

| | | |
|---|---|---|
| 684,973 | 3/1930 | France. |
| 242,328 | 1/1912 | Germany. |

DAVID J. WILLIAMOWSKY, *Primary Examiner.*

B. WYCHE, *Assistant Examiner.*